A. J. FELLOWS.

Improvement in Tape-Measures.

No. 5,008. Reissued July 30, 1872.

Witnesses.
J. H. Shumway
H. A. Bull

Alvin J. Fellows
Inventor
By Atty.
John E. Earle

AM. PHOTO-LITHOGRAPHIC CO. N.Y. (OSBORNE'S PROCESS.)

UNITED STATES PATENT OFFICE.

ALVIN J. FELLOWS, OF NEW HAVEN, ASSIGNOR TO NATHANIEL L. BRADLEY AND WALTER HUBBARD, OF MERIDEN, CONNECTICUT.

IMPROVEMENT IN TAPE-MEASURES.

Specification forming part of Letters Patent No. 79,965, dated July 14, 1868; reissue No. 5,008, dated July 30, 1872.

DIVISION A.

*To all whom it may concern:*

Be it known that ALVIN J. FELLOWS, of New Haven, in the county of New Haven and State of Connecticut, has invented a new Improvement in Tape-Measures; and we do hereby declare the following, when taken in connection with the accompanying drawing and the letters of reference marked thereon, to be a full, clear, and exact description of the same, and which said drawing constitutes part of this specification, and represents, in—

Figure 1:
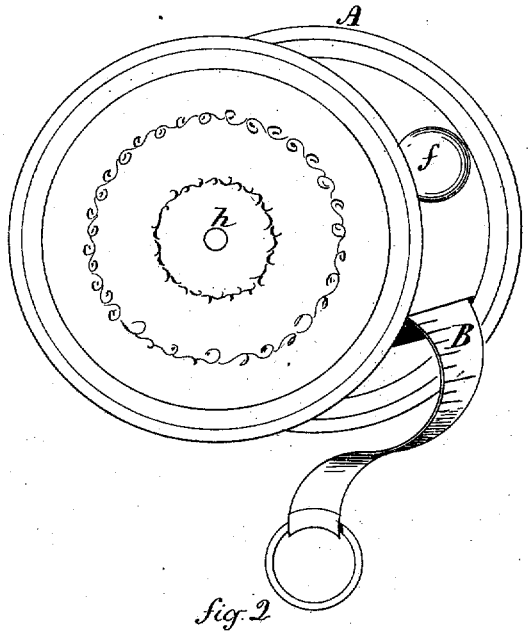
Figure 2:
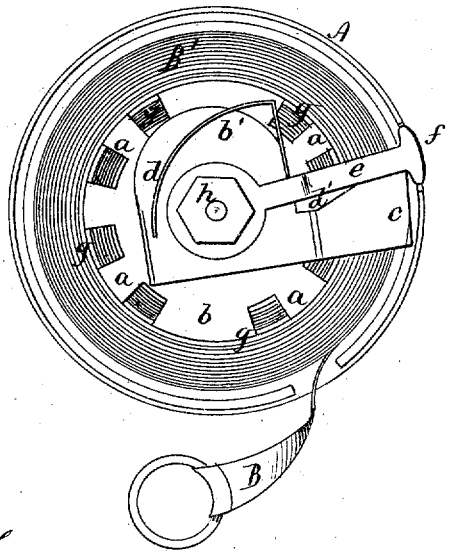

Figure 1, an enlarged perspective view of the apparatus as it will appear when ready for use; and in Fig. 2, a plan of the same with the movable side taken off, showing the internal structure of the apparatus.

This improvement consists in the manner of fitting the spring-click, which detains the main or primary spring to the central part of the mainspring-barrel, so as to hold the tape at any desired position.

The spiral or helical springs are fitted to wind up the tape in the usual way, as indicated in several sections at *a a*, &c., by securing it in a suitable sheet-metal barrel, as shown at *b*, and attaching its inner end to the arbor or stud *h* and its outer end to the periphery or rim of the barrel, as is done in watches, &c., as indicated in Fig. 2. On this stud or arbor *h*, and outside of the head *b* of the mainspring-barrel, is fitted a piece of sheet metal, *b'*, in such a position that its outer end will rest in the periphery of the case, as shown at *c*, Fig. 2. To this plate or piece the spring-click is attached, as shown at *d d'*, in such a manner that the working end *d'* will hook over the edge of the arm *e* of the knob *f* in such a manner that the click, acting against the projection *g g*, &c., on the barrel, will prevent the recoil of the mainspring and hold the tape at any desired position, and let it back at pleasure.

Having made and arranged the parts as before described, the tape B is wound on, as represented at B', Fig. 2, the plate *b' c* put on with the click-spring *d* and *d'*, and the arm *e* with its knob *f*, when the whole will appear as represented in Fig. 2. Then screw the movable cap or side of the case onto the arbor *h*, when the whole will appear as represented in Fig. 1.

We are aware that metallic cases have been used with the same kind of mainspring, and with a click-spring attached to the removable side or cap of the case, by being soldered to its inner surfaces, and a knob attached to the outer surface of the said removable side to release the click and allow the tape to be drawn in by the mainspring; we, therefore, do not claim any such device; but We do claim, as the invention of the said ALVIN J. FELLOWS—

The combination of the case A with the plate *b'*, click-spring *d d'*, and the arm *e*, and knob *f*, when the whole is constructed, arranged, and fitted for use substantially as herein described.

N. L. BRADLEY,
WALTER HUBBARD,
*Assignees of Alvin J. Fellows.*

Witnesses:
L. K. CURTIS,
JOHN Q. THAYER.